United States Patent
Fernandes

(10) Patent No.: US 11,869,276 B2
(45) Date of Patent: Jan. 9, 2024

(54) COMMUNICATION DEVICE, COMPUTER-IMPLEMENTED METHODS AND SOFTWARE FOR OBTAINING INFORMATION OFFLINE

(71) Applicant: MASTERCARD INTERNATIONAL INCORPORATED, Purchase, NY (US)

(72) Inventor: Lloyd Fernandes, Maharashtra (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1032 days.

(21) Appl. No.: 16/293,454

(22) Filed: Mar. 5, 2019

(65) Prior Publication Data
US 2019/0279434 A1    Sep. 12, 2019

(30) Foreign Application Priority Data
Mar. 8, 2018 (SG) .......................... 10201801949X

(51) Int. Cl.
| | | |
|---|---|---|
| G06F 3/0481 | (2022.01) | |
| G07B 15/00 | (2011.01) | |
| G06Q 20/32 | (2012.01) | |
| G06Q 20/16 | (2012.01) | |
| G06F 3/0484 | (2022.01) | |
| H04N 23/54 | (2023.01) | |
| G06K 7/14 | (2006.01) | |

(52) U.S. Cl.
CPC .......... *G07B 15/00* (2013.01); *G06F 3/0481* (2013.01); *G06F 3/0484* (2013.01); *G06Q 20/16* (2013.01); *G06Q 20/3223* (2013.01); *H04N 23/54* (2023.01); *G06K 7/1417* (2013.01)

(58) Field of Classification Search
CPC ..... G07B 15/00; G06F 3/0481; G06F 3/0484; G06Q 20/16; G06Q 20/3223; H04N 5/2253; G06K 7/1417
See application file for complete search history.

(56) References Cited

U.S. PATENT DOCUMENTS 6,415,156 B1 * 7/2002 Stadelmann .............. G07F 7/00
455/406
9,020,837 B1   4/2015 Oakes et al.
(Continued)

FOREIGN PATENT DOCUMENTS

KR         20140020639 A  *  2/2014  ............. G06Q 50/30

OTHER PUBLICATIONS

Shafranovich, Yakov., "Common Format and MIME Type for Comma-Separated Values (CSV) Files", Memo, Oct. 2005, The Internet Society, 9 pages, Accessed online at URL: https://tools.ietf.org/html/rfc4180.

*Primary Examiner* — Phenuel S Salomon
(74) *Attorney, Agent, or Firm* — Armstrong Teasdale LLP

(57) ABSTRACT

An application running on a user's mobile communication device photographically captures images of a code image. The code image may be permanently displayed at the transport location, or may be provided on a vehicle temporarily at the transport location. The displayed code image encodes travel data including ticket prices of a travel service from the transport location, and the application decodes the travel data from the captured images. The user can use the application to purchase a travel ticket on the travel service.

17 Claims, 8 Drawing Sheets

(56) References Cited

U.S. PATENT DOCUMENTS

| | | | |
|---|---|---|---|
| 2002/0143633 A1* | 10/2002 | Kunstadt | G06Q 20/20 |
| | | | 705/16 |
| 2003/0119478 A1* | 6/2003 | Nagy | G06Q 20/325 |
| | | | 455/406 |
| 2006/0224470 A1* | 10/2006 | Garcia Ruano | G06Q 20/20 |
| | | | 705/40 |
| 2007/0027803 A1* | 2/2007 | Brandes | G06Q 20/223 |
| | | | 705/39 |
| 2010/0327056 A1* | 12/2010 | Yoshikawa | G06Q 20/4016 |
| | | | 235/380 |
| 2011/0284627 A1* | 11/2011 | Stefani | G06Q 90/20 |
| | | | 235/375 |
| 2013/0138521 A1 | 5/2013 | Want et al. | |
| 2013/0268304 A1* | 10/2013 | Doshi | G06Q 20/0457 |
| | | | 705/5 |
| 2014/0279479 A1 | 9/2014 | Maniar et al. | |
| 2014/0358783 A1* | 12/2014 | Mansur | G06Q 20/10 |
| | | | 705/44 |
| 2015/0312041 A1* | 10/2015 | Choi | H04L 63/0861 |
| | | | 713/175 |
| 2015/0317569 A1* | 11/2015 | Renaudie | G06Q 10/02 |
| | | | 705/5 |
| 2016/0311348 A1* | 10/2016 | Watson | B60R 11/0252 |
| 2017/0032485 A1* | 2/2017 | Vemury | G06Q 50/265 |
| 2018/0165783 A1* | 6/2018 | Edakunni | G06Q 50/30 |

\* cited by examiner

| Rows\Columns | Columns 0 | 1 | 2 | 3 |
|---|---|---|---|---|
| Row 0 | RouteID | "Stop1" | "Stop2" | "Stop3" |
| 1 | "Stop1" | 0 | 10 | 20 |
| 2 | "Stop2" | 10 | 0 | 30 |
| 3 | "Stop3" | 20 | 30 | 0 |

FIG. 8

COMMUNICATION DEVICE, COMPUTER-IMPLEMENTED METHODS AND SOFTWARE FOR OBTAINING INFORMATION OFFLINE

CROSS REFERENCE TO RELATED APPLICATIONS

This patent application claims priority to Singapore Patent Application No. 10201801949X filed on Mar. 8, 2018, the disclosure of which is incorporated by reference herein in its entirety as part of the present application.

BACKGROUND

The present disclosure relates to a communication device, a computer-implemented method, and a computer program product (software composed of program instructions), for obtaining information offline, in particular information relating to travel.

Various websites exist for obtaining information about scheduled transport services (a term which is used in this document to include bus, train, tram, and ferry services, and even scheduled air services). Recently it has been proposed to provide quick response codes (QR codes) at locations where users board a vehicle of the travel service ("transport locations", e.g. bus or tram stops) embedding a web address of such a website. The QR codes are readable by a mobile communication device (e.g., a smartphone or tablet) carried by the user, and the communication device extracts the web address, and uses it to obtain information over the internet about train services, often including real-time information about the location of vehicles (e.g., trains, trams, buses, ferries, or aircraft). Sometimes the website allows the user to buy a ticket for the travel service.

Of course, this relies on the communication device being able to establish a connection to the internet. This is particularly a problem in some developing countries where online access is less reliable, and where the proportion of mobile telephones which are internet-enabled is relatively low.

As a result, it is still very common for individuals carrying a communication device to queue to buy their tickets from a ticket vendor (either a human ticket vendor or a ticket machine provided by the travel operator). This can waste a considerable amount of the travelers' time, especially if it causes the traveler to miss the vehicle he or she was hoping to catch. From the point of view of the travel providers, it is expensive to provide ticket vendors at each of the transport locations.

Often, to avoid this expense, travel services permit users to board a vehicle and buy their tickets there, for example from the bus driver or from a specialist ticket collector (i.e., a ticket collector other than the driver), but this system is subject to disadvantages. In the case that the tickets are purchased from the driver of the vehicle, the driver may be unable to move the vehicle until all necessary tickets have been purchased, slowing down the progress of the vehicle. On the other hand, there are additional costs for a travel service operator in employing a specialist ticket collector, and also a risk that the ticket collector will not reach the travelers before the travelers reach their destination, and dismount from the vehicle.

From the point of view of passengers, purchasing their tickets on the vehicle means that when the ticket collector reaches them, they have to pay whatever the correct price for the journey is. This may be an unpleasant surprise: if they had known in advance what the cost of travel was, they might have decided to use another means of travel, or to have travelled at a different time with lower prices.

BRIEF DESCRIPTION

The present disclosure aims to provide new and useful mobile communication devices, computer-implemented methods, and computer systems.

As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Furthermore, the "payment card" may exist only as a data structure (i.e., without physical existence), which is registered with a digital wallet or cloud wallet.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

BRIEF DESCRIPTION OF THE DRAWINGS

A system which is an embodiment of the disclosure will now be described for the sake of example only with reference to the following drawings in which:

FIG. 8 is an exemplary table of travel data used in the method of FIG. 3.

DETAILED DESCRIPTION

Figure 1:
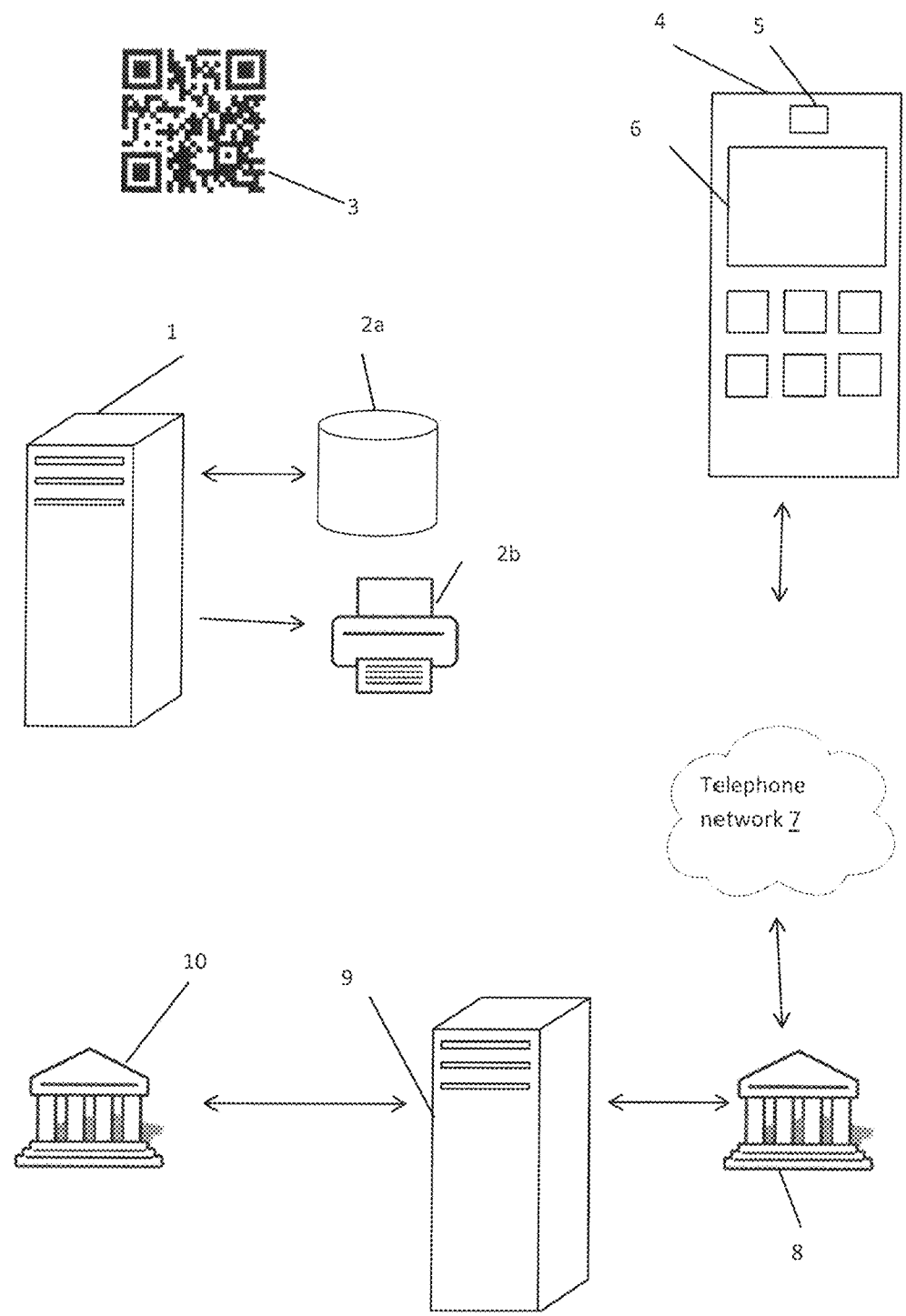
FIG. 1 shows a computerized network which employs a method according to the disclosure.

In general terms, the present disclosure proposes that a software application running on a mobile communication device associated with a user photographically captures one or more photographic images of at least one code image. The code image(s) may be permanently displayed at the transport location, or may be provided on a vehicle temporarily at the transport location. The displayed code image(s) encodes travel data including travel prices of a travel service from the transport location, and the application decodes this travel data from the captured images. The application is operative, under the control of the user, to use the travel data to purchase a travel ticket on the travel service.

Thus, the user is permitted to obtain the travel data, and initiate payment for a travel ticket using the mobile communication device, even if the mobile communication device is not able to establish a radio-frequency data communication channel to the internet to obtain the travel data from a website. This makes it unnecessary for the user to queue to purchase a travel ticket. From the point of view of the travel operator, there is a reduced requirement to provide ticket vendors at travel locations.

The disclosure further makes it unnecessary for the user to defer purchasing a ticket until the user has boarded a vehicle of the transport service and encountered a ticket collector there. From the point of view of the travel operator, the travel operator has a reduced requirement to provide a ticket collector on the vehicle. Furthermore, since users are enabled to buy tickets more easily in advance of booking, the travel service operator may be more able to insist that users purchase travel tickets board vehicles of the travel service, and thus reduce the risk of losing money due to unscrupulous travelers who only buy a ticket if they meet a ticket collector.

The mobile communication device may be enabled to make a payment for the ticket in an "offline mode". That is, the payment is instructed without the communication device using a data communication channel to the internet (i.e., not using an Internet Protocol (IP)), of the kind provided by a WiFi network, LAN network, or a wireless communication according to one of the conventional standards of mobile telecommunications (such as 3G, 4G, or 5G). For example, the term "offline" may be used to mean that the payment does not employ any data transmission apart from telephony data, i.e. those communications which are conventionally sent over a telephone network to establish a voice call (e.g., to transmit the telephone number of the recipient of the call) and to carry the voice data. Expressing this more precisely, the communication may substantially exclusively use communications according to the GSM (Global System for Mobile Communications) standard, using GSM channels. The communications may be in the format of Unstructured Supplementary Service Data (USSD) code and/or Short Message Service (SMS) code.

The mobile communication device may be one which is not operative to form a data communication channel other than for GSM communication (e.g., it may only support GSM communication). Alternatively or additionally, the mobile communication device may be one which is only capable of supporting the 2G standard which only permits data communication at an inconveniently slow rate. Enabling the payment to be made in an offline move thus means that a user of such a mobile communication device can nevertheless benefit from the present disclosure.

Furthermore, even if the user's mobile communication device is capable of internet data communication, performing the payment as an offline payment means that the method can be carried out in a travel location whether there is no coverage by a communications network which supports data transmission over the internet (e.g. a LAN network, WiFi network, or 3G/4G/5G network), or where there is no such communications network which the mobile communication device is authorized to access.

The displayed image(s) are typically not in a human-readable form (e.g., written in human-language characters such as Arabic numerals or Roman letters). In particular, the displayed image(s) may include one or more QR (quick response) codes. QR codes are two-dimensional barcode images. The format of QR codes is conventionally according to multiple standards, including ISO/IEC 18004:2000, ISO/IEC 18004:2006, ISO/IEC 18004:2015, and the displayed image(s) used in the present disclosure may include one or more QR codes according to any one or more of these standards, or further QR standards which may be proposed in the future.

The travel data may include (i) an identifier code for a transport route, (ii) data identifying a plurality of travel locations along the travel route, and (iii) one or more fares for travel along the identified route between the travel locations. The travel data may be in the form of a CSV (comma separated values) format data file. This is an efficient format which means that the size of the data file is not much more than absolutely required to contain the travel data. Although the term "comma" is used here, the expression CSV is to be understood as including the possibility that one or more other character(s) are used as a delimiter, such as colons.

Figure 2:
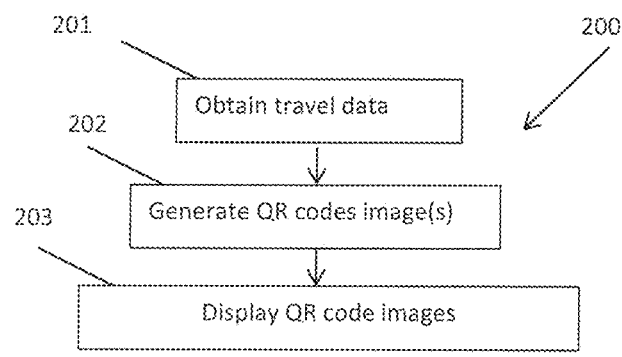
FIG. 2 shows a method performed by a server of the computerized network of FIG. 1.
Figure 3:
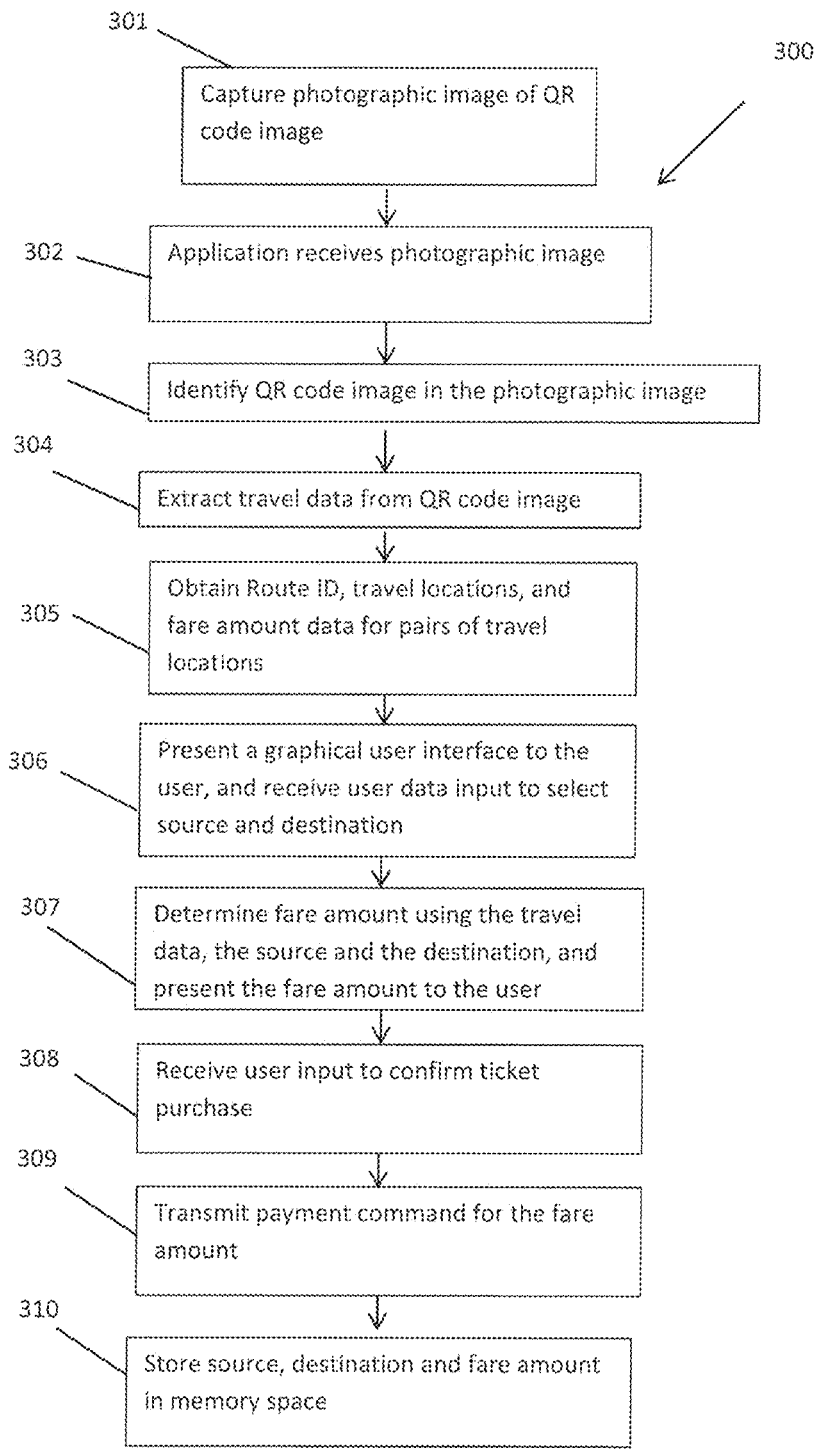
FIG. 3 shows a method performed by a computer program running on a mobile communications device of the computerized network of FIG. 1.

Turning to FIG. 1, a computerized network is shown which is an embodiment of the disclosure. FIG. 2 shows the steps of a method 200 performed by a server of the computerized network. FIG. 3 shows the steps of a method 300 performed by a mobile communication device of the computerized network.

The computerized network includes a travel operator server 1 operated by a provider of a travel service. The travel operator server 1 is operatively coupled to a travel data database 2a and a printer device 2b. In a first step 201 of the method 200, the travel operator server 1 obtains travel data from the travel database 2a describing a transport service provided by the travel operator along a transport route. The obtained travel data may include an identity (ID) number for the transport route. It may further include an ordered list of travel locations along the route. It may further include fare data describing fare amounts for travel between all pairs of the travel locations. Typically, the fares will be different for different respective pairs of the travel locations (e.g., higher for two travel locations which are further apart along the route), but the disclosure is not limited in this respect, and the fare data may, for example, specify that the same fare amount for each pair of the travel locations.

FIG. 8 is a table showing a possible set of travel data. This is presented as a matrix representation of the CSV data, in order to help the reader visualize it. The second row ("Row 0") includes a RouteID for a certain route (e.g., in the case of travel route which is a bus route, it may be denoted BusID), and then the names of three travel locations along the route ("Stop1", "Stop2", "Stop3"). Note that these names may be the actual names of travel locations on the route, or alternatively ID codes of the travel stops ("station codes"). The numbers in the part of the table which is columns 1 to 3 and rows 1 to 3, show the fare amount between pairs of the travel locations. For example, the fare amount from stop 2 to stop 3 is indicated in row 2 and column 3 as "30" in some currency. In the example of FIG. 8, the fare amount from any first one of the travel locations to any second one of the travel locations is the same as the fare amount from the second travel location to the first travel location, the embodiment is not limited in this respect. Also, the fare from a given travel location to itself is indicated as zero, but again this need not be the case: a fare may be charged for entering a restricted area of the travel location.

In a second step 202, the travel operator server 1 uses the travel data to generate at least one QR code 3. A first sub-step of step 202 may be to encode the travel data as CSV-format data (such as data abiding by the RFC-4180 standard), in which data is text in fields which are separated by commas and each line ends with a carriage return line feed (CRLF) symbol, such as a space.

Thus, in the case of the travel data of FIG. 8, the CSV-format data may be:

RouteID,"Stop1","Stop2","Stop3" CRLF
"Stop1",0,10,20 CRLF
"Stop2",10,0,30 CRLF
"Stop3",20,30,0 CRLF The csv can be visualized as a 2D matrix with components (i, j) for i and j integers in the range 0 to 3. The diagonal elements (1,1), (2,2), and (3,3) are marked with 0, and the (0,0)-th element is marked with RouteID (or BusID). Row0 and Column0 also contain the names of the travel locations (stops) in "camelCaseEnclosedInQuotes" without any white-spaces between them, with the 1st element (0,0) for this row and column being an exception which represents the unique RouteID (or Bus ID) without any white-spaces again.

To put this another way, the CSV data file is as follows:
Row 0: This line starts with the RouteID field that would mark the beginning of a file. The rest of the fields would be a list of bus stops the bus would stop at. The row ends with a CRLF (Carriage Return Line Feed).

Column 0 has the same content as Row 0.

Fares: The bus fares between the stops are marked using the matrix's row-column combination Stop1-Stop2 and vice versa. The combination of same stops like (Stop1-Stop1) are marked with a fare of 0. Each row ends with a CRLF (Carriage Return Line Feed).

Note that the size of CSV-format data far can be smaller if the data in FIG. 8 conforms to certain pre-known constraints. For example, if the fares can be assumed to be symmetrical (e.g., the fare from any first one of the travel locations to any second one of the travel locations is the same as the fare from the second travel location to the first travel location), less CSV-format data is required to describe it. For example, the CSV-format data may be data specifying the values of just a sub-set of elements of a two-dimensional matrix; other elements of the 2-D matrix may be pre-known (e.g., the values of many of the diagonal elements are zero), or identical to respective ones of the sub-set of the elements of the matrix specified by the CSV-format data. In one example the CSV-format data may specify the element of an upper triangle of the two-dimensional matrix (i.e., all the elements above the main diagonal of the matrix). Equivalently, the CSV-format data may be date specifying the values of just the lower triangle of a two-dimensional matrix (i.e., all the elements below the main diagonal of the matrix).

The second sub-step of step 202 is to generate a QR code from the CSV-format data file. The algorithm used in step to generate the QR code 3 from the CSV-format data may be a known algorithm, and is not described here.

In step 203, the QR code 3 is displayed at a transport location which is along the transport route. This may for example include using the printer 2b to print the QR code 3 onto a display item which is an element of printable material (e.g., a sheet of paper), and positioning the display item in a place where it is public ally visible. For example the display item may be positioned permanently or semi-permanently at some or all of the transport locations on the route (e.g., affixing it to an element of a building erected at the transport location). Alternatively, the display element may be provided in a viewable portion of a vehicle which travels along the transport route, so that it is displayed at each transport location when the vehicle is at that transport location. For example, in the case of a transport service which is a bus, the QR code 3 may be embedded or pasted on bus depots, bus stops and/or bus poles (within the buses). In a further alternative, step 203 may be performed by printing the QR code 3 in a distributed publication such as a newspaper. Alternatively or additionally, the QR code 3 may be displayed in step 203 on an electronic display device, such as an LED or LCD screen, as well as, or instead of, printing the QR code 3 onto a display item.

The method 200 is now complete.

We now explain a method 300 of using the displayed QR code 3 with reference to FIG. 3. The method 300 is carried out by a mobile communication device 4 associated with the user, and which the user has brought to a location where a QR code 3 is displayed, such as transport location. The mobile communication device 4 is capable of communicating over a telecommunication network 7 which is a telephone network. The telephone network 7 at least supports communications according to the GSM (Global System for Mobile Communications) standard, over GSM channels, and the mobile communications device 4 is capable of sending and receiving GSM communications over the telephone network 7. Typically the telephone network 7 also supports internet protocol (IP) communication, and optionally the mobile communication device 4 may do so also.

In step 301 of the method 300 of FIG. 3, the user uses a camera 5 of the mobile communication device 4 to capture a photographic image of the QR code 3.

Figure 4:
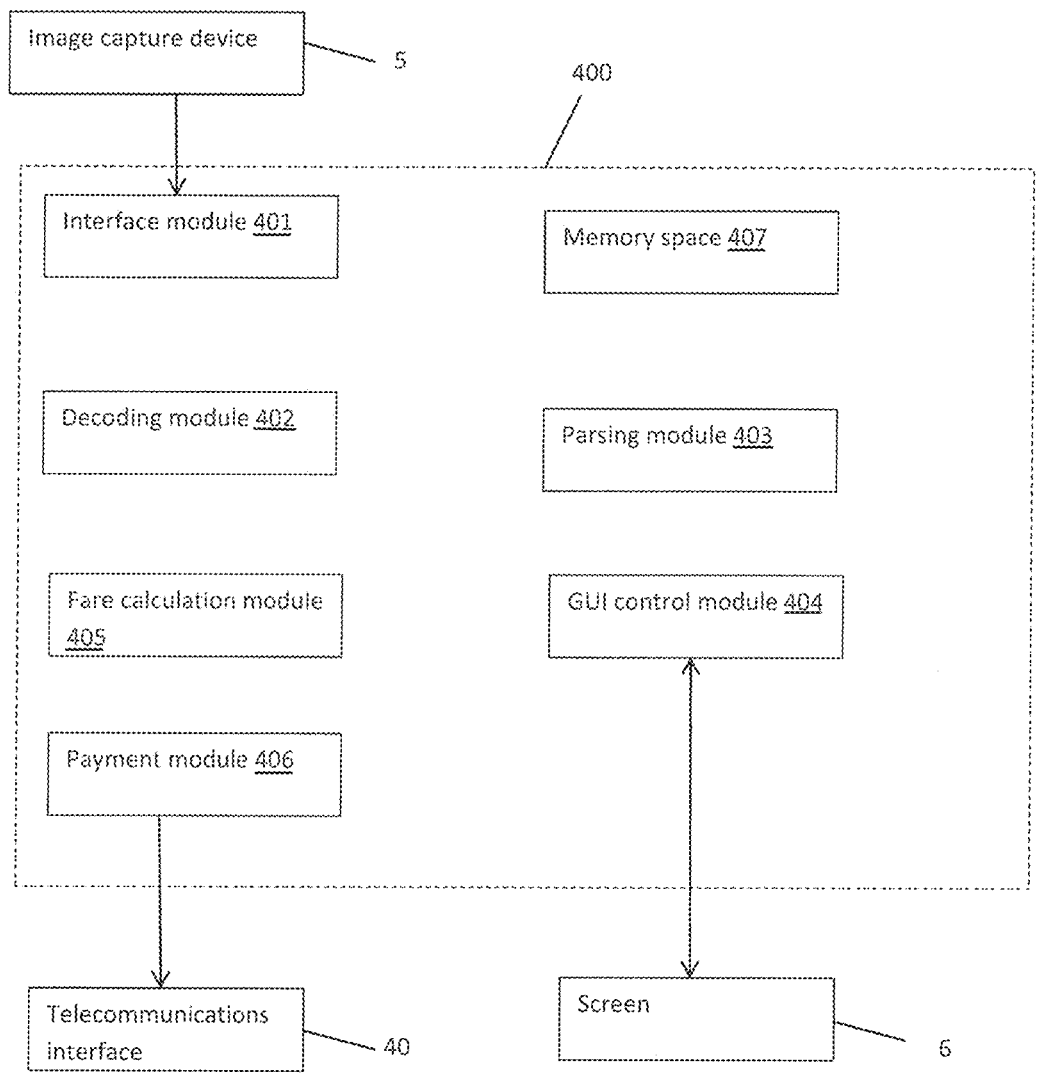
FIG. 4 shows schematically the structure of the computer program.

Steps 302 to 310 of method 300 are performed by a computer program 400 (an application composed of program instructions) installed on the mobile communication device 4. The structure of the application 400 is illustrated schematically in FIG. 4. In step 302, the application 400 receives the captured image from the camera 5 through an interface module 401 of the application 400.

In step 303, a decoding module 402 identifies the QR code in the photographic image.

In step 304, the decoding module 402 extracts the travel data encoded in the QR code from the captured image, by regenerating the CSV-format data file. Various QR code readers are publicly known which can perform this step. Some, such as Zxing Java API (available from the online library zxing.net), represent CRLF as a "white space". Thus, the parsing of the travel data would consider all white-spaces as line-delimiters. The decoding module 402 may store the textual data in a string variable, splitting the travel data into rows based on the white-spaces. In the example above, this would result in 4 rows:

Read row-0: Split row0 content based on commas (,). This would have four fields. Field 1 contains the RouteID (e.g., in the case of a bus a BusID). The remaining three fields provide the list of travel locations (source\destination points). The parsing module 403 would create a Map of Maps using the stops as keys and values would be a LinkedHashMap with the key again as the stop names and the values would represent the fare amounts. Note that LinkedHashMap would retain the order in which the stops are read.

Read row-1 to Read row-3: Again all other rows can be split based on commas (,). The first field specifies the source name (e.g., Stop1). The other fields would specify the fares to the destinations from that source, iterated in the order while parsing the row-0. Thus the order of the stops in row-0 would be important in using these rows.

In step 305, a parsing module 403 parses the travel data to obtain an ID number (RouteID) of the transport route. It further obtains a "source and destination list" which is a list of travel locations which are a possible starting travel location (a "source") and an ending travel location (a "destination") for a journey along the route. It further obtains the fare amounts associated with corresponding pairs of stops on the route (i.e., each pair is composed of a source and a destinations).

Specifically, given the travel data extracted in step 304, the parsing module reconstructs a table having the content of FIG. 8. Each of the stops listed in column 0 is taken in turn, and the following steps are performed:

(i) treat this stop as a source for the journey.
(ii) successively treat each of the stops in row 0 as a destination.
(iii) for this source and destination pair, obtain the corresponding fare amount from the travel data.

The exact code which would be used to perform this process would depend on the exact format of the CSV-format data. For example, it would be modified if the CSV-format data in fact specifies only a sub-set of the elements of the matrix (e.g., upper//lower triangular matrix representation).

In step 306, a GUI control module 404 of the application 400 controls the screen 6 of the mobile communication device 4 to present a graphical user interface (GUI) to the user, to display at least a portion of the travel data. The screen 6 may be touch sensitive, in which case the GUI may receive user input to make at least one transport location selection, such as a source and destination. Alternatively or additionally, the user may input data using other data input devices of the mobile communication device 4.

Figure 5:
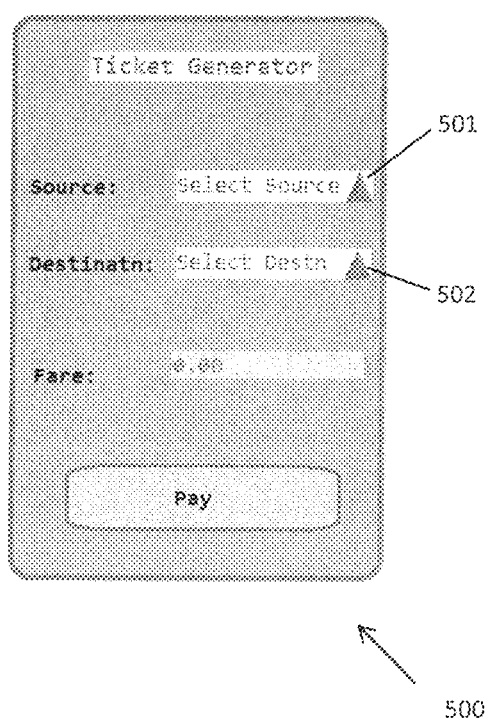
FIG. 5 shows a graphical user interface generated by the computer program.

An exemplary GUI 500 is shown in FIG. 5. The names of the stops in the travel data are used to populate two menus (such as drop down menus) which are displayed using the respective areas 501, 502.

Specifically, when the user touches the area 501, the GUI 500 displays an ordered list of the names of the transport locations (stops) on the current transport route. The user may use the GUI to select one of the transport locations as a starting location (source) for a journey along the transport route. For example, the names of the transport locations may be displayed in respective areas of the GUI 500 so that the user can choose one of the stops by touching the corresponding area. Alternatively, the user may be able to select one of the stops by scrolling through a list of options, and then touching an area of the GUI 500 to indicate that a currently displayed one of the options is selected.

If the travel data included the full names of the stops, this data may be transferred directly to the GUI for display in the manner explained above. Alternatively, if the travel data included only ID codes (stop codes) for the transport location, the application 400 may be operative to use the ID codes to obtain corresponding transport location names from a database (e.g., stored within the communication device 4), and these are displayed in the manner explained above.

Similarly, when the user touches the area 502, the GUI displays the names of the transport locations (stops) on the current transport route. The user may use the GUI to select one of the transport locations as a destination location (source) for a journey along the transport route.

In step 307, a fare calculation module 405 determines the fare amount corresponding to the source and destination from the data output by the parsing module 403 in step 305, and uses the GUI control module 404 to display the fare in the GUI 500.

In step 308, the GUI control module 404 of the mobile communication device 4 receives user input to confirm that the user wishes to buy a ticket at the specified fare amount. In response to this confirmation, in step 309 a payment module 406 of the application 400 initiates a process of payment for the fare amount obtained in step 307. The payment may be managed by digital wallet service such as MasterPass® where the user has previously registered a payment card associated with a payment account maintained by the user at the issuer bank of the payment card.

The payment may be made using an online payment mechanism (that is, using an internet-based communication channel) or an offline payment mechanism.

In the online case, the application 400 may, for example, be an application for implementing an internet banking payment.

One suitable known offline payment mechanism is based on Unstructured Supplementary Service Data (USSD) code. This payment mechanism is currently popular in several developing countries, and may be implemented, for example, using a Unified Payment Interface (UPI) app. A UPI app makes it possible to transfer money directly from one bank account to another just by using a VPA (virtual payments address) or a phone number. In one option using a USSD code, the payment module 406 controls a telecommunications interface 40 of the mobile communication device 4 to communicates using GSM communications over a GSM communication channel supported by the telephone network 7 with a bank server 8 operated by a bank at which the user holds a payment account.

An example of a known USSD system is the *99# service provided by the National Payments Corporation of India (NPCI). A user registers a mobile communication device 4 (which does not have to be an internet-enabled mobile communication device) with his or her bank. Having done this, the user is able to obtain mobile banking services, such as making a payment from a bank account associated with the user and held at the bank, by dialing *99# from their mobile communication device 4.

Irrespective of whether the payment is online or offline, the payment module 406 may generate a payment command in a pre-defined format, and transmits the payment command to the telecommunications interface 40 of the mobile communication device 4. The telecommunications interface 40 is operative to form a communication channel with a communications network. In the case of offline payments, the telecommunications interface 40 may be one which is not operative to perform data communication of Internet mobile data. FIG. 1 illustrates the case in which the communications network is the mobile telephone network 7. In this case, the telecommunications interface 40 is operative to form a GSM communication channel to a mobile telephone network 7.

The telephone network 7 may recognize the format, and accordingly relay the message to the bank server 8. The payment command includes payment account identity data sufficient to identify to the bank server 8 a payment account associated with the user. The payment account identity data may only be sufficient to do this when in combination with other data included in the transmitted telephony data, such as a telephone number of the mobile communication device 4. In other words, the payment account identity number may be a code which, in combination with a telephone number of the communication device 4, is sufficient for the bank server 8 to identify the account number. Alternatively, the payment account identity number may be an account number. Alternatively, it may be a payment card number (e.g., a conventional 16 digit primary account number (PAN)) associated with a payment card associated with the payment account, or a token representing a payment card number.

The mobile communication device 4 may store the payment account identity number so that the payment module 305 can generate the payment command automatically in step 309 without the user entering the payment account identity number.

In response to receiving the payment command, the bank server 8 performs an authorization operation. If the authorization operation is successful, the bank server 8 debits the fare amount (optionally plus a handling charge) from the payment account associated with the user.

The bank server 8 also carries out a process for making a payment to an acquirer bank where the transport operator maintains a payment account (for the sake of simplicity, it is assumed here that the acquirer bank is a different bank from the issuer bank). The payment may use a conventional payment procedure, e.g., in which a message is sent to an acquirer bank server 10 (such as via a payment card network server 9) to instruct the acquirer bank server 10 to transfer the fare amount (optionally minus a handling charge) into the payment account of the transport operator. Additionally, and typically subsequently, the issuer bank makes a corresponding payment to the acquirer bank. Conventionally a payment from the issuer bank to the acquirer bank is made as part of a periodic clearing operation which covers multiple payment transactions.

The bank server 8 transmits the result of the authorization operation to the application 400 over the telephone network 7. If the authorization operation was successful, the application 400 generates an e-ticket, e.g. in a conventional format, which is stored in the mobile communication device 4. The user may show the e-ticket to ticket inspectors upon request, or use it to control an automatic ticket barrier.

In step 310, the application stores the selected source and destination, and the fare amount in a memory space 407 of the application. The application may allow the user to employ this information in the future to buy another ticket for travel along the route, so that, on another occasion in the future the method 300 can be carried out without performing steps 301 to 306. Thus, the user would not have to scan the QR code 3 again to obtain the travel data, or select the source and destination. The user may, however, be given the option to perform steps 301 to 306 in the case that he or she wishes to make a journey he or she has not previously made. The data stored in the memory space 407 may expire after a certain time, so ensure that it is not used after it is out of date. For example, it be stored with a time stamp, and the application may be configured only use the data within a predetermined period after the date specified by the time stamp.

Currently a single QR code 3 can store a maximum of 4296 characters. Thus assuming the station codes and fare values each use 3-4 characters, a single conventional QR code would able to provide fares for around 27 to 30 stops approximately. This calculation is based on the assumption that fares may be asymmetric (i.e., the fare for a journey between two stops depends upon the direction of travel), but if the fares are assumed to be symmetric (independent of the travel direction), the number of stops may be higher. Furthermore, this value may change with upgrades to the existing QR code generation algorithms. Furthermore, optionally, in step 301 the user may capture photographic images of multiple QR codes, and information from the multiple QR codes may be extracted and combined in steps 303 and 304.

Figure 6:
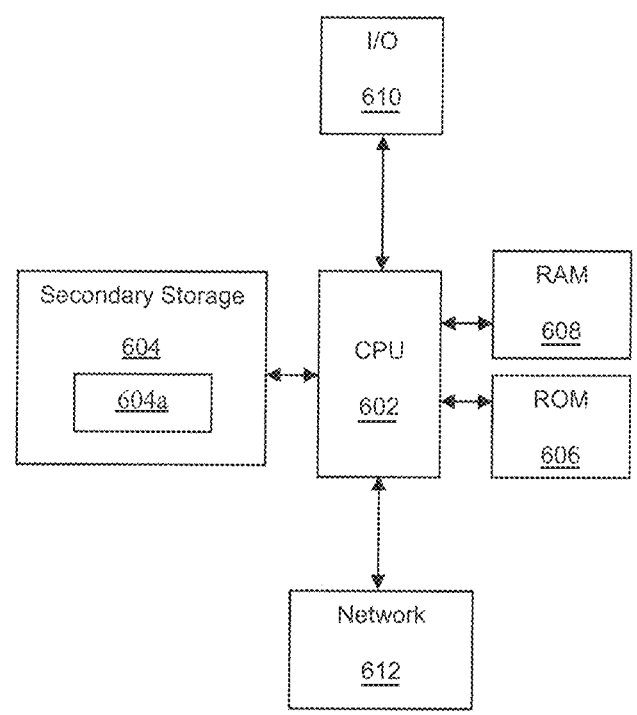
FIG. 6 shows the structure of the server.

FIG. 6 is a block diagram showing a technical architecture of each of the servers 1, 8, 9, 10.

The technical architecture includes a processor 602 (which may be referred to as a central processor unit or CPU) that is in communication with memory devices including secondary storage 604 (such as disk drives), read only memory (ROM) 606, and random access memory (RAM) 608. The processor 602 may be implemented as one or more CPU chips. The technical architecture may further include input/output (I/O) devices 610, and network connectivity devices 612.

The secondary storage 604 typically includes one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution.

In this embodiment, the secondary storage 604 has a component 604a including non-transitory instructions operative by the processor 602 to perform various operations of the method of the present disclosure. The ROM 606 is used to store instructions and perhaps data which are read during program execution. The secondary storage 604, the RAM 608, and/or the ROM 606 may be referred to in some contexts as computer readable storage media and/or non-transitory computer readable media.

I/O devices 610 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 612 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 612 may enable the processor 602 to communicate with the Internet or one or more intranets. With such a network connection, it is contemplated that the processor 602 might receive information from the network, or might output information to the network in the course of performing the above-described method operations. Such information, which is often represented as a sequence of instructions to be executed using processor 602, may be received from and outputted to the network, for example, in the form of a computer data signal embodied in a carrier wave.

The processor 602 executes instructions, codes, computer programs, scripts which it accesses from hard disk, floppy disk, optical disk (these various disk based systems may all be considered secondary storage 604), flash drive, ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 602, the RAM 608, and the ROM 606 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Figure 7:
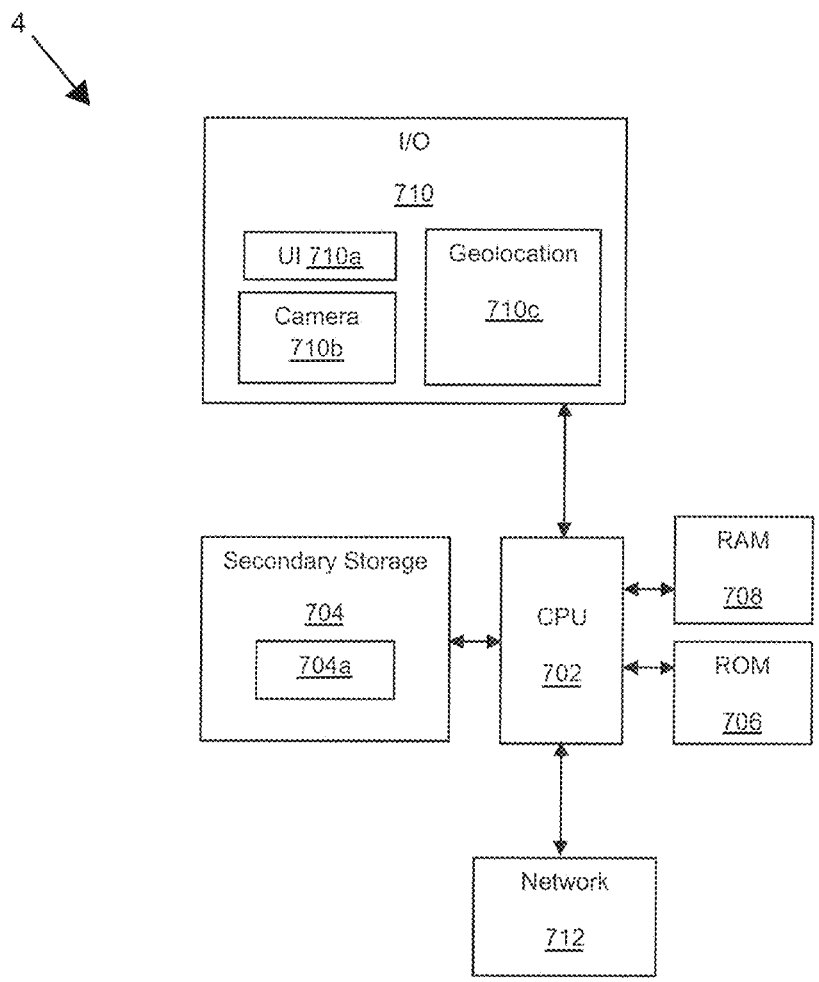
FIG. 7 shows the structure of the mobile communication device.

FIG. 7 is a block diagram showing a technical architecture of the mobile communication device 4. It is envisaged that in embodiments, the mobile communication device 4 will be a smartphone or tablet device, but it may alternatively be a simpler communication device, such as one which is only capable of communicating according to a mobile telephone standard (e.g., for transmission of GSM data but not general mobile data).

The technical architecture includes a processor 702 (which may be referred to as a central processor unit or CPU) that is in communication with memory devices including secondary storage 704 (such as disk drives or memory cards), read only memory (ROM) 706, and random access memory (RAM) 708. The processor 702 may be implemented as one or more CPU chips. The technical architecture further includes input/output (I/O) devices 710, and network connectivity devices 712.

The I/O devices include a user interface (UI) 710*a*, a camera 710*b* (which corresponds to the image capture device 5 of FIG. 1), and a geolocation module 710*c*. The UI 710*a* may include a touch screen (such as the screen 6 of FIG. 1), keyboard, keypad, or other known input device. The camera 710*b* allows a user to capture images and save the captured images in electronic form. The geolocation module 710*c* is operable to determine the geolocation of the communication device using signals from, for example global positioning system (GPS) satellites.

The secondary storage 704 typically includes a memory card or other storage device and is used for non-volatile storage of data and as an over-flow data storage device if RAM 708 is not large enough to hold all working data. Secondary storage 704 may be used to store programs which are loaded into RAM 708 when such programs are selected for execution.

In this embodiment, the secondary storage 704 has a component 704*a*, including non-transitory instructions operative by the processor 702 to perform various operations of the method of the present disclosure. The ROM 706 is used to store instructions and perhaps data which are read during program execution. The secondary storage 704, the RAM 708, and/or the ROM 706 may be referred to in some contexts as computer readable storage media and/or non-transitory computer readable media.

The network connectivity devices 712 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 712 may enable the processor 702 to communicate, e.g. via a mobile network, with the Internet or one or more intranets. With such a network connection, it is contemplated that the processor 702 might receive information from the network, or might output information to the network in the course of performing the above-described method operations. Such information, which is often represented as a sequence of instructions to be executed using processor 702, may be received from and outputted to the network, for example, in the form of a computer data signal embodied in a carrier wave.

The processor 702 executes instructions, codes, computer programs, scripts which it accesses from hard disk, floppy disk, optical disk (these various disk based systems may all be considered secondary storage 704), flash drive, ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors.

Whilst the foregoing description has described exemplary embodiments, it will be understood by those skilled in the art that many variations of the embodiment can be made within the scope and spirit of the present disclosure.

For example, as noted above, the issuer bank may impose a handling charge, such that the amount of money debited from the user's account is equal to the fare amount plus the handling charge. Although in the explanation above, the fare amount displayed to the user in step 307 is the fare amount encoded in the QR code for the selected source-destination pair, optionally it may instead be that fare amount plus the handling charge.

Alternatively or additionally, in the explanation of the embodiment given above, the same QR code 3 is displayed at each of the transport locations. However, alternatively different QR codes may be associated with different corresponding ones of the transport locations. At each of the transport locations, the corresponding QR code may be displayed. The QR code would encode travel data which is specific to the associated location, e.g. fare amounts from the associated location to other transport locations along the route. In the case of a QR code which is displayed on a vehicle, the QR code may be displayed in a time-varying way, such that at a time when the vehicle is at a given transport location (and/or shortly after the vehicle leaves), the QR code which is displayed on the vehicle is one associated with that travel location. When the method 300 is performed, the application 400 may be able to obtain the source location from the QR code, as the source location associated with the QR code. In this case, the user would only have to select the destination in step 306. Making the QR code be different for different ones of the transport locations reduces the amount of travel data the QR code has to store (e.g., it may only store fare amounts from the associated travel location, rather than between all pairs of travel locations along the transport route).

In a further variation, the travel data may, for one or more of the source-destination pairs, include different fare amounts for different times of day. The application 400 may be operative in step 307 to select the appropriate fare amount for a selected source-destination pair based on the current time, e.g. as specified by an internal clock of the mobile communication device 4.

What is claimed is:

1. A mobile communications device comprising:
   (a) an image capture device operative to capture a photographic image;
   (b) a screen;
   (c) a telecommunications interface;
   (d) a data storage device arranged to store program instructions; and
   (e) a processor operatively coupled to the image capture device, the screen, the telecommunications interface, and the data storage device;
   wherein the program instructions are operative, when executed by the processor, to cause the processor:
   to receive at least one photographic image captured by the image capture device including at least one quick response (QR) code with a plurality of travel data encoded therein including a starting location for travel and one or more destinations for travel from the starting location;
   in the case of a said photographic image which includes at least one QR code encoding a plurality of travel data and without accessing an external data source, to recognize the at least one QR code image and extract the plurality of travel data encoded in the QR code;
   to present to a user on the screen a graphical user interface incorporating at least a portion of the plurality of travel data directly taken from the QR code;
   to receive a user selection of a travel ticket;
   without accessing an external data source, to determine a fare amount using the plurality of travel data and the user selection of the travel ticket;
   to determine whether the mobile communication device is online or offline;
   if the mobile communication device is offline, to perform an offline payment to authorize the travel ticket; and
   when the mobile communication device is online, to control the telecommunications interface to transmit a payment instruction for the determined fare amount subsequent to the completion of travel.

2. A mobile communications device according to claim 1, wherein the telecommunication interface is a mobile telephone interface, and wherein the program instructions are operative to cause the processor to control the telecommunications interface to transmit the payment instruction by transmitting telephony data over a Global System for Mobile Communications (GSM) communication channel of a telecommunication network.

3. A mobile communications device according to claim 2, wherein the payment instruction is a USSD code.

4. A mobile communications device according to claim 1, wherein the program instructions are operative to cause the processor to perform the steps of recognition of the code image and extraction of the plurality of travel data therefrom, wherein the code image is a quick response (QR) code encoding the plurality of travel data.

5. A mobile communications device according to claim 1, wherein the program instructions are operative to cause the processor to extract the travel data from the QR code where the plurality of travel data is encoded in a comma-separated values (CSV) format.

6. A mobile communications device according to claim 1, wherein, in the case that the plurality of travel data encodes location data identifying a plurality of travel locations, the program instructions are operative to cause the processor to display the GUI in a form which permits the user to select one of the travel locations, and to receive a user selection of at least one of the travel locations as a destination.

7. A mobile communications device according to claim 6, wherein, in the case that the travel data indicates fare amounts between pairs of the travel locations, the program instructions are operative to cause the processor to determine the fare amount as a fare amount for the travel ticket specified by the plurality of travel data for travel from a source which is one of the travel locations, to the selected destination.

8. A mobile communications device according to claim 1, wherein the program instructions are operative to cause the processor to determine the fare amount from the plurality of travel data and the user selection when the communications device is offline.

9. A mobile communications device according to claim 1 wherein, upon the processor extracting the travel data, the travel data is stored within the communications device, and upon receiving the user selection, the processor is arranged to extract the plurality of travel data from storage and determine the fare amount while the communications device is offline.

10. A mobile communications device according to claim 1, wherein the program instructions are operative to cause the processor to control the telecommunications interface to transmit the payment instruction by transmitting telephony data over a telephone communication channel.

11. A mobile communications device according to claim 10, wherein the program instructions are operative to cause the processor to perform the step of extraction of the travel data from the code image on the assumption that the travel data is encoded in a comma-separated values (CSV) format.

12. A method performed by a mobile communications device in an offline mode, the method comprising:
(a) an image capture device of the mobile communications device capturing at least one photographic image which includes at least one quick response (QR) code encoding a plurality of travel data therein including a starting location for travel and one or more destinations for travel from the starting location;
(b) identifying the at least one QR code in the photographic image;
(c) extracting the plurality of travel data from the at least one QR code without accessing an external data source;
(d) presenting a graphical user interface to a user on a screen of the mobile communication device, the graphical user interface incorporating at least a portion of the plurality of travel data encoded in the QR code;
(e) receiving user data input to make a selection of a travel ticket;
(f) without accessing an external data source, determining a fare amount using the plurality of travel data and the user selection of the travel ticket;
(g) determining whether the mobile communication device is online or offline;
(h) if the mobile communication device is offline, performing an offline payment to authorize the travel ticket; and
(i) when the mobile communication device is online, controlling a telecommunications interface of the mobile communication device to transmit a payment instruction for the determined fare amount subsequent to the completion of travel.

13. A method according to claim 12, wherein the payment instruction is sent over a telephone communication channel by transmitting telephony data over a Global System for Mobile Communications (GSM) communication channel of a telecommunication network.

14. A method according to claim 12, wherein the at least one quick response (QR) code image encoding the plurality of travel data in a comma-separated values (CSV) format, wherein the plurality of travel data encodes location data identifying a plurality of travel locations, and wherein the user selection comprises selecting at least one of the travel locations as a destination.

15. A method according to claim 12 further comprising the steps of recognition of the at least one QR code and extraction the plurality of travel data therefrom the at least one QR code encoding the plurality of travel data.

16. A method according to claim 12, wherein the plurality of travel data includes location data identifying a plurality of travel locations, the method further comprises displaying the GUI in a form which permits the user to select one of the travel locations, and to receive a user selection of at least one of the travel locations as a destination.

17. A method according to claim 12, wherein the payment instruction is a USSD code.

\* \* \* \* \*